(12) United States Patent
Viaud

(10) Patent No.: US 7,681,382 B2
(45) Date of Patent: Mar. 23, 2010

(54) ADJUSTING ARRANGEMENT FOR THE TONGUE OF AN AGRICULTURAL BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 169 days.

(21) Appl. No.: 11/452,806

(22) Filed: Jun. 14, 2006

(65) Prior Publication Data

US 2007/0044447 A1 Mar. 1, 2007

(30) Foreign Application Priority Data

Aug. 25, 2005 (DE) .................. 10 2005 040 174

(51) Int. Cl.
*A01D 75/28* (2006.01)
(52) U.S. Cl. .................. 56/10.2 E; 56/15.9; 56/341
(58) Field of Classification Search ............ 56/10.2 R, 56/10.2 A, 10.2 D, 10.2 E, 10.2 F, 14.9, 15.1, 56/15.6, 15.9, 16.1, 121.46, 218, DIG. 10, 56/DIG. 14, DIG. 15
See application file for complete search history.

(56) References Cited

U.S. PATENT DOCUMENTS

| | | | | |
|---|---|---|---|---|
| 2,710,514 A | * | 6/1955 | Broussard | 56/15.9 |
| 3,182,730 A | * | 5/1965 | Murphy | 172/7 |
| 3,975,890 A | * | 8/1976 | Rodger | 56/208 |
| 4,150,724 A | * | 4/1979 | Strobel | 172/328 |
| 4,379,491 A | * | 4/1983 | Riewerts et al. | 172/328 |
| 4,381,036 A | * | 4/1983 | Fardal et al. | 172/2 |
| 4,549,481 A | * | 10/1985 | Groeneveld et al. | 100/98 R |
| 4,606,413 A | * | 8/1986 | Hake | 172/328 |
| 4,838,015 A | * | 6/1989 | Mouret et al. | 56/15.7 |
| 5,329,754 A | * | 7/1994 | Fuesz | 56/504 |
| 5,794,421 A | * | 8/1998 | Maichle | 56/10.2 E |
| 6,035,943 A | * | 3/2000 | Gerein et al. | 172/328 |
| 6,125,775 A | * | 10/2000 | Gust | 111/52 |
| 6,421,990 B1 | * | 7/2002 | Ohlemeyer et al. | 56/10.2 R |
| 6,546,705 B2 | * | 4/2003 | Scarlett et al. | 56/10.2 R |
| 6,594,978 B2 | * | 7/2003 | Viaud | 56/10.2 E |
| 7,051,501 B2 | * | 5/2006 | Schlesser et al. | 56/15.2 |
| 7,063,167 B1 | * | 6/2006 | Staszak et al. | 172/328 |
| 2001/0003236 A1 | * | 6/2001 | Viaud | 53/589 |

(Continued)

FOREIGN PATENT DOCUMENTS

DE 102 12 722 10/2003

(Continued)

OTHER PUBLICATIONS

European Search Report, Dec. 18, 2006, 4 Pages.

(Continued)

*Primary Examiner*—Robert E Pezzuto
*Assistant Examiner*—Mai T Nguyen

(57) ABSTRACT

An agricultural baler is provided having an adjusting arrangement between a tow bar and a frame, that maintains the spatial relationships existing in the baler constant so that there is no effect upon the flow of the crop. The use of a sensor and a positioning arrangement provides the assurance that the repositioning is not dependent upon the capability of an operator, and finally the arrangement of the sensor in the region of the take-up device sees to it that the signals are transmitted at the exact time, not too soon and not too late.

11 Claims, 3 Drawing Sheets

U.S. PATENT DOCUMENTS

2004/0217645 A1* 11/2004 Ponet et al. .................... 303/7
2007/0214760 A1* 9/2007 Bomleny et al. .......... 56/10.2 E

FOREIGN PATENT DOCUMENTS

| | | |
|---|---|---|
| DE | 10319184 | 11/2004 |
| DE | 10360598 | 7/2005 |
| EP | 0645077 | 3/1995 |
| EP | 1 208 738 | 5/2002 |
| FR | 2 369 790 | 6/1978 |
| FR | 2 546 368 | 11/1984 |
| WO | 98/17096 | 4/1998 |

OTHER PUBLICATIONS

German Search Report, Jan. 16, 2009, 4 Pages.

* cited by examiner

ADJUSTING ARRANGEMENT FOR THE TONGUE OF AN AGRICULTURAL BALER

FIELD OF THE INVENTION

The present invention relates generally to an agricultural baler with a frame, a tow bar and a take-up device.

BACKGROUND OF THE INVENTION

Balers, particularly roto-balers manufactured at this time, an example of which is described in WO-A1-98/17096, are equipped with take-up devices, so-called pick-ups, that are intended to take up the widest possible swaths in order to attain a high harvesting capacity. So that the take-up device maintains a certain distance from the ground at all times, support wheels are provided on it.

A roto-baler is known from U.S. Pat. No. 4,838,015 in which the position of the take-up device is controlled by the raising and lowering of steering arms of a two-point coupling in the rear region of the agricultural tractor. Particularly in today's high speeds in the baling it appears impossible for an operator to constantly look to the rear during the operation to see whether the take-up device maintains the correct distance from the ground.

EP-A-1 208 738 also discloses a roto-baler, this time, however with sensors that determine the distance between the take-up device and the ground and move the take-up device upward or downward as a function of the distance so determined. In this solution the relative position between the take-up device and a following conveyor rotor or a conveyor channel leading to it changes.

Finally FR-A-2 546 368 discloses a roto-baler in which the entire frame is raised hydraulically by an operator on an agricultural tractor in order to maintain the correct operating height of the take-up device. The take-up device cannot be readjusted with respect to the frame of the baler.

The problem underlying the invention is seen in the fact that material flow problems can occur downstream of the take-up device if the position of the take-up device varies too much due to sudden changes in the height of the ground. This is the result of the fact that the support wheels can change the position of the take-up device while the frame of the baler on which the take-up device is suspended remains in its position. In other cases in which not only the position of the take-up device but also the position of the entire baler is changed, the control is too inexact, particularly since it depends on the attention of an operator.

SUMMARY OF THE INVENTION

In view of the foregoing, it is an object of the invention to provide a baler wherein the position of the take-up device is not changed in order to conform to irregularities of the ground, but the position of the entire baler, so that the spatial relationships existing in the baler remain constant and there is no effect upon the flow of the crop. The use of a sensor and a positioning arrangement provides the assurance that the repositioning is not dependent upon the capability of an operator, and finally the arrangement of the sensor in the region of the take-up device sees to it that the signals are transmitted at the exact time, not too soon and not too late.

The positioning signal can be derived from a multitude of sensor types; but non-contact sensors have the advantage that they are less sensitive in applications that are typical of agricultural machines. Such sensors can be applied between the frame and the take-up device, as well as between the take-up device and the ground. The use of a non-contact sensor, for example, a high frequency sensor or an ultrasonic sensor, provides the assurance that this replacement of the support wheel will not offer any interception point to catch any harvested crop. Moreover the non-contact sensor also delivers an exact signal when the ground deflects slightly, a situation in which the support wheel would sink in under the high weight of the take-up device.

A sensor supported on the ground has the advantage that electrical radiation signals are not required which could cause measurement errors under unfavorable conditions, for example, if the ground is overgrown with weeds or the like.

The arrangement of one or more sensors underneath the take-up device, that is, within its perimeter, offers protection against mechanical troubles for the sensor. But the sensor can also be arranged in a leading position and hold the position of the sensor stable in case it encounters a small depression which it can recognize in advance. In case the sensor or sensors are arranged ahead of the take-up device, this can be provided with one or more arms extending forward above the take-up device.

If the sensor is provided between the take-up device and the frame of the baler, the take-up device can follow the contour of the ground by means of support wheels or similar support elements and create a signal therefrom relative to the frame of the baler. Since the adjustment path is relatively short and the area of the sensor can be protected in view of its small size, this arrangement is very trouble-free.

While basically Hall sensors or mechanical sensors could be applied, sensors using a potentiometer to detect the relative position between the sensor and the take-up device represent a very precise method of measurement, that can be very easily incorporated into the adjustment arrangement.

An embodiment arranged in such a way that several sensors are provided across the width of the take-up device has the result that the change in the height is not measured at a single location, but is detected at several locations across the width of the take-up device and a useful average or an extreme value can be formed thereby.

Adjustment arrangements with electric or hydraulic drive operate rapidly and can be driven with high forces. Hydraulic control or regulating arrangements usually include electromagnetically controlled valves with which rapid and desired adjustment movements can be performed.

In order to avoid an excessive number of switching operations it makes sense if an area is defined and stored in the signal processing arrangement within which the position of the take-up device can be repositioned with respect to the frame and thereby with respect to a following conveying device, without the need for a position correction. Preferably such a tolerance region can be changed in order to accommodate various crop or operating conditions.

To reduce cost of the control or regulation and the expense of the configuration, it is sufficient to operate the adjustment arrangement actively in one direction only while gravity is used in the other direction. If necessary, a positioning force can also be generated by means of a mechanical or pneumatic spring.

If the take-up device can be pivoted vertically about a horizontal axis extending generally transverse to the direction of operation of the baler, that has the advantage that the take-up device can be pivoted within limits without the need to correct the positioning process. In addition this pivot bearing support permits the take-up device to be raised into a transport position without the need to bring the baler itself into another position by means of the tow bar.

A rigid attachment of the take-up device to the frame of the baler avoids the cost of a height adjustment arrangement that would otherwise exist. In this case the adjustment of the height of the take-up device is performed by the adjustment arrangement.

The use of a deactivation arrangement to deactivate the signal processing unit or the regulating arrangement when the take-up device has assumed a predetermined position avoids an adjustment of the position of the take-up device to the contour of the ground on the basis of signals, even though this is not desired at that time, for example, during transport operations.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
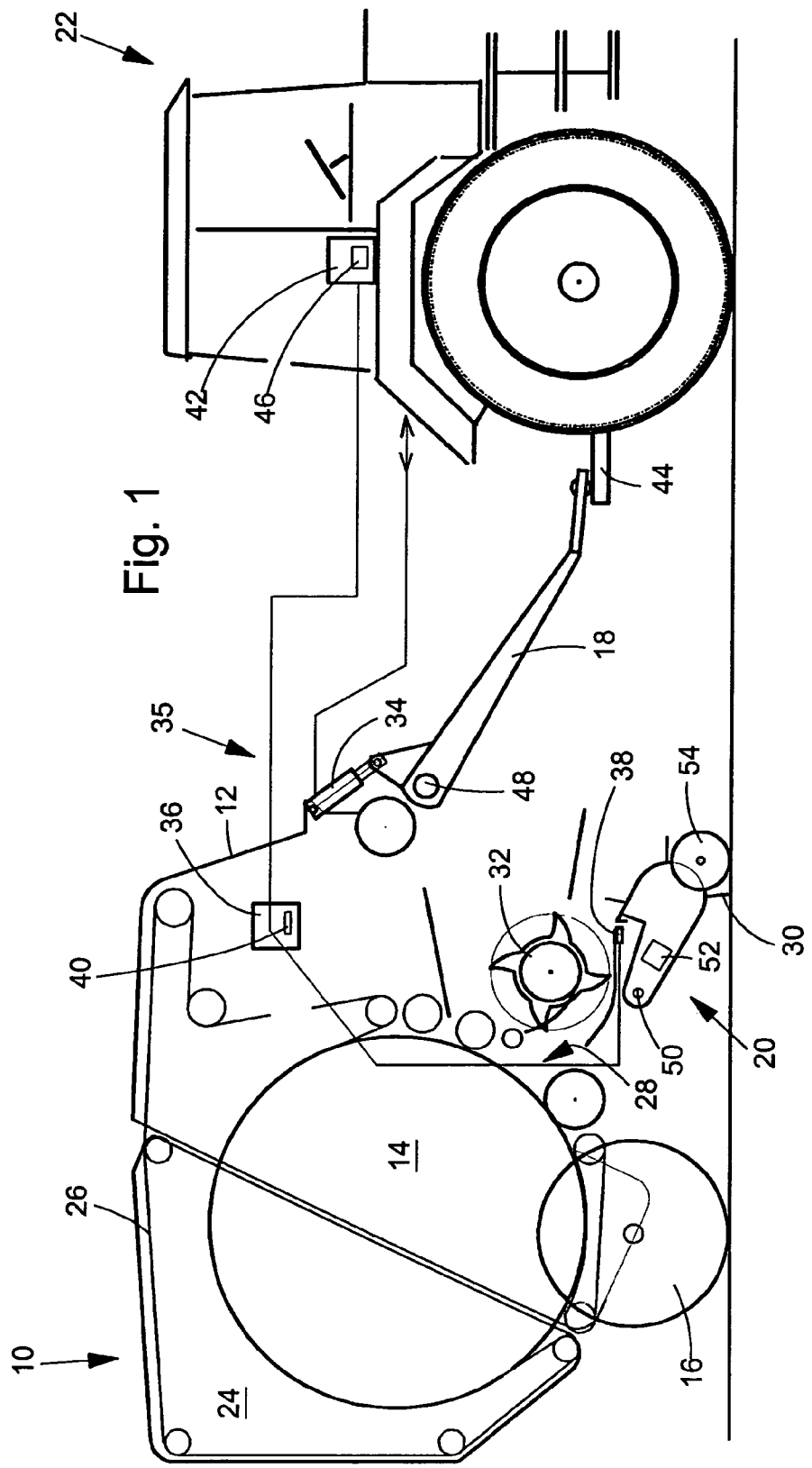
FIG. 1 is a schematic side view of a baler attached to a towing vehicle on a level support surface.

A baler 10, according to the drawing, is provided with a frame 12, a baling chamber 14, wheels 16, a tow bar 18 and a take-up device 20 and is towed by a towing vehicle 22.

In the embodiment shown the baler 10 is configured as a roto-baler with a baling chamber 14 of variable size; instead another type of baler could be selected, for example, a roto-baler with a baling chamber of constant size, a baler of rectangular bales, a large baler or a similar towed implement with a take-up device 20.

The frame 12 is configured as a weldment and carries side walls 24 between which baling elements 26 extend. The baling chamber 14 is enclosed at its sides by side walls 24 and around its circumference by the baling elements 26. The baling elements 26 leave an opening at one location at the front and below that forms an inlet 28, through which harvested crop can be fed into the baling chamber 14. The wheels 16 support the frame 12 or the entire baler 10 on the ground.

The tow bar 18 establishes a connection between the frame 12 and the towing vehicle 22 and extends above the take-up device 20. The tow bar 18 is attached to the frame 12 in a bearing 48, free to pivot vertically about a horizontal axis that extends transverse to the direction of operation and is retained or repositioned by an adjustment arrangement 34 in its position relative to the frame 12. The tow bar 18 engages the towing vehicle 22 at a tow pendant 44 whose height with respect to the towing vehicle cannot be changed.

The take-up device 20 is configured in the form of a so-called pick-up, that is, it is equipped with several rows of resilient circulating tines that brush over the ground and thereby raise harvested crop lying on the ground and convey it to the rear into the inlet 28. As is shown, but is not required, a conveyor rotor 32 may be provided between the take-up device 20 and the inlet 28 that may, if necessary, be configured as a cutting arrangement, however this is not mandatory. The take-up device 20 is fastened to the frame 12 in known manner, and therefore not shown in any further detail, it can pivot vertically about a bearing 50. In an embodiment, not shown, the take-up device 20 is connected rigidly to the frame 12. An excessively large downward movement is limited by a stop 52.

The take-up device 20 is equipped with support elements 54, in particular, support wheels that are arranged so that the take-up device 20 maintains a certain distance from the ground at all times and follows any changes in the height of the ground. The position of the take-up device 20 should be selected in such a way that the tines 30 brush over the ground at all times with a small spacing, this should possibly apply to the entire width of the take-up device 20. In that way the take-up device 20 should be prevented from sinking downward when it operates temporarily with a part of its width or its entire width across a depression or the like. On the other hand, the take-up device 20 should be raised into a non-operating position when the baler operates in transport mode.

To control or regulate the distance between the take-up device 20 and the ground, an adjusting arrangement 35, of a control device 36 is provided which includes a sensor 38, a signal processing unit 40, an input unit 42 and various connecting lines that finally affect the adjusting arrangement 34.

In its simplest configuration the adjusting arrangement 34 is configured as a single-acting hydraulic cylinder that can be controlled by an electromagnetic valve, not shown but known in itself. A single acting hydraulic motor or hydraulic cylinder is sufficient since the downward movement is performed by the force of gravity. Indeed, the adjusting velocity can be increased by means of a double-acting hydraulic cylinder. In place of the hydraulic cylinder, an electric motor with spindle drive could also be used. The adjusting arrangement 34 can also be operated from the towing vehicle 22 independently of the signal processing unit 40, in order to raise the take-up device 20 into its transport position and/or to lower it to the ground.

In the embodiment shown the adjusting arrangement 34 operates automatically only across one part of the maximum adjusting path of the take-up device 20, in particular only as far as an adjustment during the operation is required. If the take-up device 20 is to be raised into the transport position, this is performed by extending the adjusting arrangement 34 and the take-up arrangement 20 rests on the stop 52; alternatively a stepper motor, not shown, can be provided between the take-up device 20 and the frame 12, that completely raises the take-up device 20 for a transport operation.

Preferably the control device 36 is provided partly on the baler 10 and partly on the towing vehicle 22. In a modified configuration the control device 36 could also be located alone on the baler 10 and remotely controlled from the towing vehicle 22; it can be configured electrically, electronically, in CAN-bus technology or in other ways.

In the embodiment shown the sensor 38 is configured as a non-contact sensor 38, that is fastened to the frame 12 and transmits radiation in the high-frequency or ultrasonic range to a reference part on the take-up device 20 and utilizes its reflection performance in order to calculate the path covered and to gain therefrom a signal for the distance between the take-up device 20 and the frame 12. Since the take-up device 20 rests on the ground by means of the support elements 54, the change in the distance determined by the sensor 38 simultaneously represents the change in the contour of the ground in the area of the take-up device 20 relative to the frame 12.

According to the illustration the sensor 38 is located between the take-up device 20 and a following conveying surface for the crop being taken up; it is important that the transition from the take-up device 20 to the following component is performed as smoothly as possible, since geometrical changes in the conveying path can lead to trouble in the conveying and jams. But the sensor 38 can also be accommodated in another location where it can determine the relative position between the take-up device 20 and the frame 12 and is not exposed to the crop.

The sensor 38 can also be configured as a non-contact sensor, that is aimed at the ground and is fastened to the take-up device 20 between adjoining paths of movement of the tines 30. Moreover, the sensor 38 can instead or in addition be provided ahead of the take-up device 20 and carried by an arm, not shown in any further detail. A sensor in the form of a sliding shoe or the like, not shown, can also be provided to follow the contour of the ground.

If the change in the contour of the ground is to be detected directly by means of the sensor 38, for example, three sensors 38 can be provided across the width of the take-up device 20, in particular in the side regions and in the center. The signal processing unit 40 selects from among the signals delivered by the sensors 38 that particular signal that represents the least distance to the ground.

The signal processing unit 40 is configured in the form of an on-board computer. If necessary the signal processing unit 40 can also be configured as a removable and portable unit and used in another train. The signal processing unit 40 is based on software and/or hardware components; but preferably it contains a computer program that permits a multitude of calculation operations and connections. Energy is fed from the towing vehicle 22 into the signal processing unit 40 that permits the calculating procedures. In addition the signal processing unit 40 receives the signals from the sensor or sensors 38, so that the actual distance to the ground becomes known or can be calculated. If signals of more than one sensor 38 are fed into the unit, a determination of the signal to the smallest distance takes place, where, if necessary a timing device can also be used that prevents short-term changes in the signal of contour changes from being suppressed. A line, not described in any further detail, leads from the signal processing unit 40 to the adjusting arrangement 34, in order to transmit a signal to the latter for an extension or retraction.

The input unit 42 is usually configured in the form of a keyboard, and is appropriate to adjust or initiate certain minimum height values or operating conditions. For example, a more or less aggressive raking performance by the tines 30 could be adjusted; upper and lower limits for the take-up device 20 could also be defined, within which the take-up device 20 is allowed to move, without the need for a correction by the adjusting arrangement 34. In addition the take-up device 20 can be raised into a transport position. It is possible to arrange the signal processing unit 40 on the baler 10 and the input unit 42 on the towing vehicle 22.

In connection with the signal processing unit 40 a deactivation arrangement 46 is provided so that the take-up devices 20, for example, takes up or maintains its transport position. In the present embodiment the deactivation arrangement 46 is configured as a switch that delivers a signal to the signal processing unit 40 from which the latter recognizes that the take-up device 20 takes up or has taken up its transport position and is no longer to be repositioned on the basis of the signals of the sensors 38; this is really required only when the sensor 38 measures the distance between the frame 12 and the ground.

On the basis of the foregoing description the invention operates as follows. To begin the operation the baler 10 together with the towing vehicle 22 is operated across a field and put into operation. The signal processing unit 40 is activated so that the sensor 38 can determine the distance between the take-up device 20 and the frame 12 and reposition the adjusting arrangement 34 in according with an input from the input unit 42. When during the following operation the baler 10 is drawn across the field, the sensor 38 recognizes the changes in the surface of the ground on the basis of the support of the take-up device 20 by means of the support elements 54 and passes this information to the signal processing unit 40, where it is compared to a target value. Depending on the direction of the deviation, the adjusting arrangement 34 is then extended or retracted, in order to let the actual value agree with the target value. When the take-up device 20 is raised into its transport position, the calculation operation based on hardware or software on the part of the signal processing unit 40 is again ended on the basis of the signal from the deactivation arrangement 46. The optimum condition corresponds to that shown in FIG. 1; the necessity for a correction arises in a situation such as that shown in FIG. 2 in which the baler 10 is operated towards an elevation. Such an elevation may consist of a pile of soil, a temporary embankment or a change in the level that could occur, for example, resulting between two fields.

Figure 2:
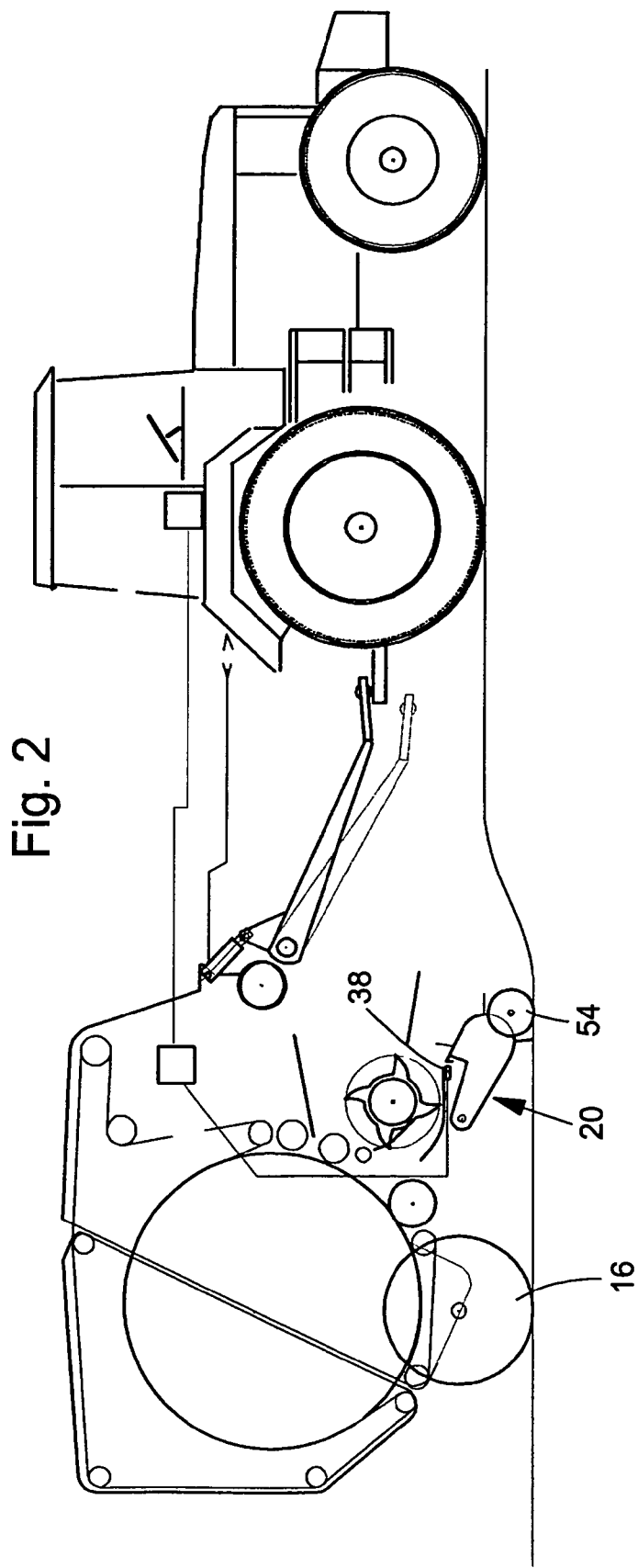
FIG. 2 is the train according to FIG. 1 where the towing vehicle is located at a higher level than the baler and its take-up device.

In the situation shown in FIG. 2, the towing vehicle 22 is already at a higher level. It can be seen that as soon as the front or the rear wheels of the towing vehicle 22 reach the higher elevation, the area of the frame 12 between the wheels 16 and the towing vehicle 22 will rise; since the take-up device 20 is supported on the ground by the support elements 54 and is not raised along with the other units, its position relative to the following conveyor rotor 32 changes. The sensor 38 recognizes a relative movement of this type, reports this to the regulating device 36 in which the signal processing unit 40 generates a correcting signal for the adjusting arrangement 34, which leads to the adjusting arrangement being retracted until the spatial relationship between the take-up device 20 and the conveyor rotor 32 again corresponds to the input, or—since the conveyor rotor 32 is supported in bearings in the frame 12 without any change—its position in relation to the take-up device. This condition is reproduced in FIG. 2. The adjusting device 36 may be configured as a control device as well as a regulating device. The deviation in the position of the tow bar 18 is shown in dashed lines.

Figure 3:
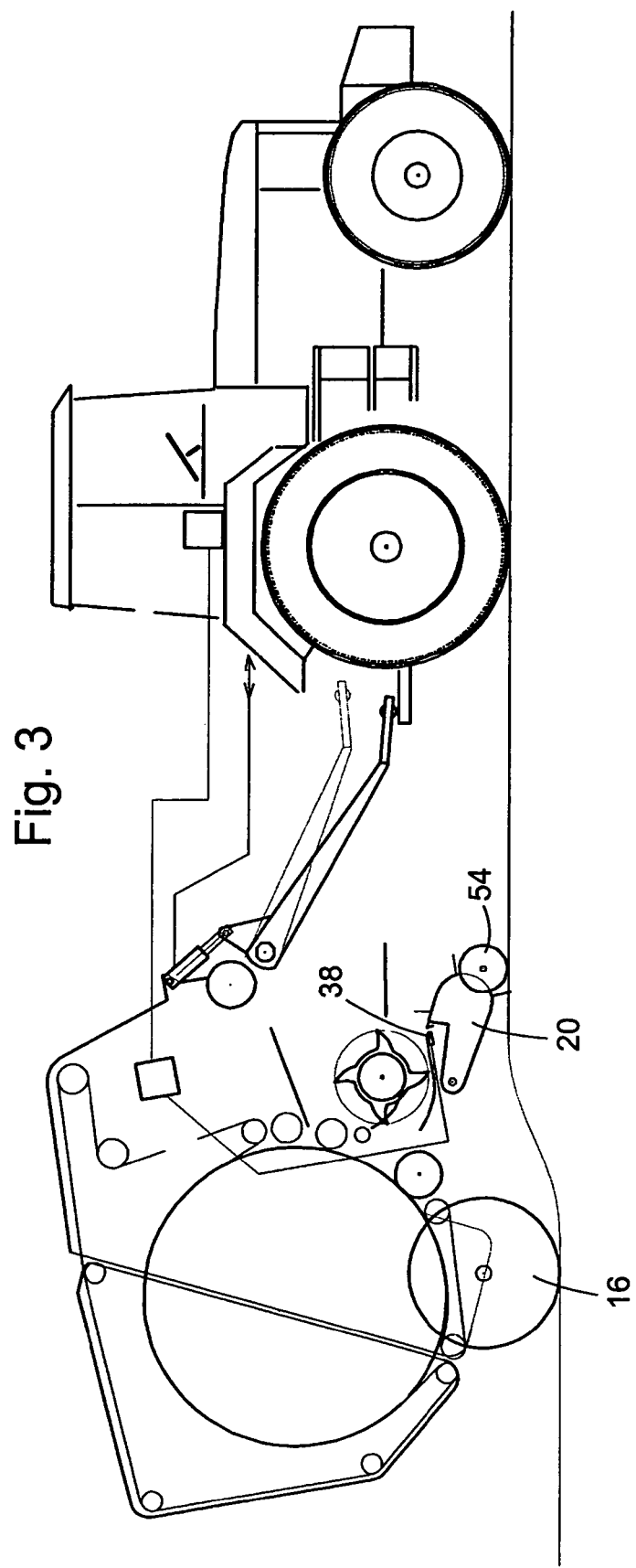
FIG. 3 is the train according to FIG. 1, where the towing vehicle and the take-up device are located at a higher level than the baler.

In the condition according to FIG. 3, the take-up device 20 has also already reached the rise, while the wheels 16 of the baler 10 are still in the lower region. Since the take-up device 20 has been raised by the rise of the ground by means of the support elements 54 which has been recognized by the sensor 38, the control device 36 determines that the adjusting arrangement 34 must be extended in order to bring the take-up device 20 to its new height or to maintain the distance at the sensor 38. Comparable processes play their part when the towing vehicle 22 or the baler 10 leave a rise in the ground or only operate through a furrow or the like, sink into wet ground, etc. In this case the deviation in the position of the tow bar 18 is also shown in dashed lines.

After all the descriptions the spatial relationship between the take-up device 20 and the following conveyor rotor 32 or the conveying surfaces associated with it remains constant at all times or, if so desired, fixed within certain limits. The adjustment is performed rapidly, since it is derived in or from the surroundings of the take-up device 20 and it is performed without a large power requirement, since the entire baler 10 is not raised, but only the position of the angle of the tow bar 18 is changed in relation to the frame 12.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. An improved agricultural baler having a frame, a tow bar, and a take-up device, wherein the tow bar is pivotally attached to the frame, the improvement comprising:
    an adjusting arrangement having a motor for the motorized adjustment of the tow bar relative to the frame;
    at least one sensor for determining changes in the height of ground in an area of the take-up device the at least one sensor being located between the frame and the take-up device; and,
    a signal processing unit for supplying data to the adjusting arrangement to effect motorized adjustment of the tow bar relative to the frame as a function of an output signal from the sensor, the signal processing unit selecting from among signals delivered by the at least one sensor, a particular signal that represents the least distance to the ground.

2. An improved agricultural baler according to claim 1, wherein the at least one sensor is configured as a non-contact sensor.

3. An improved agricultural baler according to claim 1, wherein the at least one sensor can be lowered to the ground.

4. An improved agricultural baler according to claim 1, wherein the at least one sensor contains a potentiometer for the determination of the relative position of the take-up device.

5. An improved agricultural baler according to claim 1, wherein at least one sensor comprises a plurality of sensors provided across the width of the take-up device.

6. An improved agricultural baler according to claim 1 wherein the adjusting arrangement is operated electrically or hydraulically.

7. An improved agricultural baler according to claim 1, wherein the signal processing unit transmits a signal to the adjusting arrangement only after crossing one of an adjustable lower and upper limit value.

8. An improved agricultural baler according to claim 1, wherein the adjusting arrangement can be adjusted by means of a motor only in one direction.

9. An improved agricultural baler according to claim 1, wherein the take-up device can be pivoted transverse to a direction of operation of the baler about a generally horizontal axis.

10. An improved agricultural baler according to claim 1, wherein the take-up device is rigidly attached to the baler.

11. An improved agricultural baler according to claim 1, further comprising a deactivation arrangement for deactivation of the signal processing arrangement.

* * * * *